(12) United States Patent
Mori et al.

(10) Patent No.: US 7,567,429 B2
(45) Date of Patent: Jul. 28, 2009

(54) ELECTRODE MATERIAL FOR ELECTRIC DOUBLE LAYER CAPACITOR AND PROCESS FOR PRODUCING THE SAME

(75) Inventors: Hidekazu Mori, Tokyo (JP); Kazuyo Terada, Tokyo (JP)

(73) Assignee: Zeon Corporation, Tokyo (JP)

( * ) Notice: Subject to any disclaimer, the term of this patent is extended or adjusted under 35 U.S.C. 154(b) by 298 days.

(21) Appl. No.: 11/630,203

(22) PCT Filed: Jun. 20, 2005

(86) PCT No.: PCT/JP2005/011274

§ 371 (c)(1),
(2), (4) Date: Dec. 21, 2006

(87) PCT Pub. No.: WO2005/124801

PCT Pub. Date: Dec. 29, 2005

(65) Prior Publication Data

US 2008/0030924 A1    Feb. 7, 2008

(30) Foreign Application Priority Data

Jun. 22, 2004   (JP)   .............................. 2004-183890

(51) Int. Cl.
*H01G 9/00*   (2006.01)
(52) U.S. Cl. ........................ 361/502; 361/503; 29/25.03
(58) Field of Classification Search ................. 361/502, 361/503; 29/25.03
See application file for complete search history.

(56) References Cited

U.S. PATENT DOCUMENTS

| 3,652,902 | A | * | 3/1972 | Hart et al. ..................... 361/502 |
| 6,324,049 | B1 | * | 11/2001 | Inagawa et al. .............. 361/502 |
| 6,643,119 | B2 | * | 11/2003 | Nanjundiah et al. ......... 361/502 |
| 6,842,330 | B2 | * | 1/2005 | Farahmandi et al. ........ 361/502 |
| 2002/0061449 | A1 | | 5/2002 | Maruo et al. |

FOREIGN PATENT DOCUMENTS

| JP | 62-179711 A | 8/1987 |
| JP | 9-289142 A | 11/1997 |
| JP | 2003-3078 A | 1/2003 |

* cited by examiner

*Primary Examiner*—Eric Thomas
(74) *Attorney, Agent, or Firm*—Birch, Stewart, Kolasch & Birch, LLP

(57) ABSTRACT

An electrode material for an electric double layer capacitor which include spherical particles (A) having an electrode active material and a thermoplastic binder, wherein the spherical particles (A) have a sphereness degree of not larger than 20% as defined by the equation: sphereness degree (%) $(L_l - L_s) \times 100/L_a$, where $L_s$ is short axis diameter, $L_l$ is long axis diameter, and $L_a = (L_l + L_s)/2$. The particles (A) are made preferably by a process of mixing together the electrode active material with the thermoplastic binder in a solvent to form a liquid dispersion; and then, spray-drying the liquid dispersion. An electric double layer capacitor having the electrode made from the electrode material is characterized as having low internal resistance and high capacitance.

9 Claims, No Drawings

ELECTRODE MATERIAL FOR ELECTRIC DOUBLE LAYER CAPACITOR AND PROCESS FOR PRODUCING THE SAME

BACKGROUND OF THE INVENTION

1. Technical Field

This invention relates to an electrode material for an electric double layer capacitor and a process for making the electrode material; an electrode for an electric double layer capacitor, made from the electrode material; and an electric double layer capacitor having the electrode.

The electric double layer capacitor having the electrode made from the electrode material according to the present invention has beneficial characteristics such as a high capacitance and a low internal resistance.

2. Background Art

A demand is rapidly expanded for an electric double layer capacitor which is compact and lightweight and exhibits high energy density, and the charge-discharge of which can be repeated. The charge-discharge of an electric double layer capacitor can be rapidly conducted, and thus, the capacitor can be utilized as a miniature electric source for memory back-up of a personal computer. Recently, it is expected to be used as a large electric source for electric automobiles from a viewpoint of preservation of environment and utilization of resources. For expansion of uses and development thereof, there is an increasing demand for further improvement of performance characteristics such as reduction of internal resistance, enhancement of capacitance and improvement of mechanical characteristics.

To improve the performance characteristics of the capacitor, various attempts are being made on a material for an electrode layer in the capacitor. The electrode material for the electric double layer capacitor comprises an electrode active material such as activated carbon as the major ingredient, and further comprises optional auxiliary ingredients such as an electrically conductive material and a binder for imparting performances such as electrical conductivity, adhesion and pliability. However, these auxiliary ingredients occasionally cause problems of reduction of electrode performances such as increase of resistance of the electrode and reduction of capacitance of the capacitor.

Japanese Unexamined Patent Publication S62-179711 discloses a process for making an electrode for an electric double layer capacitor comprising the steps of dispersing in water a powder prepared by pulverizing an activated carbon fiber; mixing together the thus-prepared aqueous carbon dispersion with latex of chlorosulfonated polyethylene as a thermoplastic binder; removing water from the thus-obtained mixture to prepare a solid; pulverizing the solid to prepare particles of an electrode material for an electric double layer capacitor; and press-molding the electrode material particles into an electrode for an electric double layer capacitor. However, the electrode material made by this process has poor processability and moldability, and a uniform electrode is difficult to make from the electrode material.

Japanese Unexamined Patent Publication H9-289142 has proposed a process for making an electrode for an electric double layer capacitor comprising the steps of dispersing activated carbon as an active material and a thermosetting binder in ketone such as acetone; spray-drying the thus-prepared liquid dispersion to prepare particles of an electrode material for an electric double layer capacitor; forming the electrode material particles into an electrode layer; and then sintering the thermoplastic binder in the particles at a high temperature, for example, at 900° C. to form the electrode for an electric double layer capacitor. However, the electrode for an electric double layer capacitor obtained by this process is rigid, and its use is occasionally limited because of poor pliability and poor mechanical strength.

BRIEF SUMMARY OF THE INVENTION

Problems to be Solved by the Invention

An object of the present invention is to provide an electrode for an electric double layer capacitor, which can give an electric double layer capacitor having a low internal resistance and a high capacitance, and which is pliable and has high mechanical strength and uniform density.

Further objects of the present invention are to provide an electrode material suitable for use in manufacture of the electrode for an electric double layer capacitor; and a process for making the electrode material.

The present inventors made extensive researches to achieve the above-mentioned objects, and found that an electrode material for an electric double layer capacitor having enhanced processability and moldability can be obtained by using a thermoplastic binder as a binder, and by making the electrode material from spherical particles comprising an electrode active material and the thermoplastic binder; and further found that, in the case when an electrode for an electric double layer capacitor is made from the electrode material for an electric double layer capacitor, the electrode active material and the thermoplastic binder can be uniformly dispersed in the electrode layer. It was further found that the electrode for an electric double layer capacitor has a uniform electrode density, enhanced pliability and high mechanical strength, and has a high capacitance and a low internal resistance. The present invention has been completed based on these findings.

Means for Solving the Problems

Thus, in a first aspect of the present invention, there is provided an electrode material for an electric double layer capacitor which comprises spherical particles (A) comprising an electrode active material and a thermoplastic binder wherein said spherical particles (A) have a sphereness degree of not larger than 20% as defined by the following equation:

$$\text{Sphereness degree (\%)} = (L_l - L_s) \times 100 / L_a$$

where $L_s$ is short axis diameter of the spherical particles,
$L_l$ is long axis diameter of the spherical particles, and
$L_a$ is defined by the equation:

$$L_a = (L_l + L_s)/2.$$

In a second aspect of the present invention, there is provided a process for making the above-mentioned electrode material for an electric double layer capacitor, which comprises the steps of mixing together the electrode active material with the thermoplastic binder in a solvent to form a liquid dispersion, and then, spray-drying the liquid dispersion to form the spherical particles (A).

In a third aspect of the present invention, there is provided a process for making an electrode for an electric double layer capacitor, which comprises the step of forming an electrode layer comprised of the above-mentioned electrode material for an electric double layer capacitor, on a collector.

In a fourth aspect of the present invention, there is provided an electrode for an electric double layer capacitor, which is made by the above-mentioned process.

In a fifth aspect of the present invention, there is provided an electric double layer capacitor having the above-mentioned electrode for an electric double layer capacitor.

An electrode for a double layer capacitor in the form of a layer having uniformly dispersed therein an electrode active material and a thermoplastic binder can be made from the electrode material according to the present invention. This electrode for a double layer capacitor has a uniform electrode density, enhanced pliability and a high mechanical strength, and therefore, exhibits a lowered internal resistance and an enhanced capacitance.

DETAILED DESCRIPTION OF THE INVENTION

The invention will be described in detail as follows.

The electrode material for an electric double layer capacitor according to the present invention comprises spherical particles (A) comprising an electrode active material and a thermoplastic binder.

(1). Electrode Active Material

The electrode active material used in the present invention is not particularly limited, provided that it is capable of building up electric charges in an electric double layer formed on the interface between an electrolyte and the electrode made from the electrode material. Carbon allotropes having a specific surface area of at least 30 $m^2/g$, preferably from 500 to 5,000 $m^2/g$ and more preferably from 1,000 to 3,000 $m^2/g$ are beneficially used. As specific examples of the carbon allotropes, there can be mentioned activated carbon, polyacene, carbon whisker and graphite. Of these, activated carbon is preferable. The activated carbon includes, for example, those which are made from a phenolic resin, rayon, an acrylic resin, pitch and a coconut shell. The carbon allotropes are preferably powdery or fibrous. A nano-composite of the carbon allotrope with an organic material may also be used.

Nonporous carbon containing carbon crystallites like graphite crystallites which have an expanded interlayer distance between adjacent carbon crystallites can also be used. The nonporous carbon can be produced by a process wherein easily graphitizable carbon having a multilayer graphite structure with developed microcrystallites is subjected to dry distillation at a temperature of 700 to 850° C., and then heated together with caustic alkali at a temperature of 800 to 900° C., and, if desired, the heated product is treated with hot steam to remove a residual alkali ingredient.

In the case when the electrode active material is powdery, a powder having a weight average particle diameter in the range of 0.1 to 100 μm is preferably used because an electrode for an electric double layer capacitor in the form of a thin film can be easily formed and the capacitance can be further enhanced. The weight average particle diameter is more preferably in the range of 1 to 50 μm, especially preferably 5 to 20 μm.

The electrode active material may be used either alone or as a combination of at least two thereof. In the latter case, at least two kinds of electrode active materials having different particle diameter distributions can be used in combination.

(2). Thermoplastic Binder

The thermoplastic binder used in the present invention is a thermoplastic polymer having a binding force and having a transition temperature. The transition temperature of the thermoplastic polymer usually refers to a glass transition temperature (Tg), but, in the case when the polymer is highly crystalline, a melting point (Tm) may be adopted. The thermoplastic binder used in the present invention usually has a transition temperature in the range of −80° C. to 180° C.

The transition temperature of thermoplastic binder is preferably in the range of −80° C. to 20° C., more preferably −60° C. to 0° C. When the transition temperature is in this range, the thermoplastic binder exhibits more enhanced binding force, and the electrode for a double layer capacitor can be formed at a relatively low temperature. The binder has a function of binding an electrode active material and an optional electrically conductive material with a collector. By using the thermoplastic binder, a mechanical strength and pliability can be imparted to the electrode for an electric double layer capacitor.

The thermoplastic binder used in the present invention includes, for example, diene polymers, and acrylate polymers and methacrylate polymers.

The diene polymers include a homopolymer prepared by polymerization of a conjugated diene monomer and copolymers prepared by copolymerization of a monomer mixture containing a conjugated diene monomer or monomers, and hydrogenation products of these homopolymer and copolymers. The monomer mixture for copolymerization contains a conjugated diene monomer or monomers in an amount of usually at least 40% by weight, preferably at least 50% by weight and more preferably at least 60% by weight. As specific examples of the diene polymer, there can be mentioned homopolymers of conjugated diene such as polybutadiene and polyisoprene; aromatic vinyl-conjugated diene copolymers such as a styrene-butadiene copolymer (SBR), which may be carboxyl-modified; vinyl cyanide-conjugated diene copolymers such as an acrylonitrile-butadiene copolymer (NBR); and hydrogenated SBR and hydrogenated NBR.

The acrylate polymers and the methacrylate polymers include homopolymers prepared by polymerization of an acrylic acid ester monomer and/or a methacrylic acid ester monomer, and copolymers prepared by copolymerization of a monomer mixture containing an acrylic acid ester monomer and/or a methacrylic acid ester monomer. The monomer mixture for copolymerization contains an acrylic acid ester monomer and/or a methacrylic acid ester monomer in an amount of usually at least 40% by weight, preferably at least 50% by weight and more preferably at least 60% by weight. As specific examples of the acrylate polymers and the methacrylate polymers, there can be mentioned crosslinked acrylate polymers and crosslinked methacrylate polymers, such as 2-ethylhexyl acrylate-methacrylic acid-acrylonitrile-ethyleneglycol dimethacrylate copolymer, a 2-ethylhexyl acrylate-methacrylic acid-methacrylonitrile-diethyleneglycol dimethacrylate copolymer, a 2-ethylhexyl acrylate-styrene-methacrylic acid-ethyleneglycol dimethacrylate copolymer, a butyl acrylate-acrylonitrile-diethyleneglycol dimethacrylate copolymer and a butyl acrylate-acrylic acid-trimethylolpropane trimethacrylate copolymer.

Specific examples of the acrylate polymers and the methacrylate polymers, there can be further mentioned thermoplastic elastomers which include copolymers of ethylene with an acrylic acid ester or a methacrylic acid ester such as an ethylene-methyl acrylate copolymer, an ethylene-methyl methacrylate copolymer, an ethylene-ethyl acrylate copolymer and an ethylene-ethyl methacrylate copolymer; and graft copolymers prepared by grafting a radically polymerizable monomer onto the copolymers of ethylene with an acrylic acid ester or a methacrylic acid ester. The radically polymerizable monomer for graft copolymerization includes, for example, methyl methacrylate, acrylonitrile and methacrylic acid.

The thermoplastic binder further includes an ethylene-acrylic acid copolymer, an ethylene-methacrylic acid copolymer, and fluororesins such as polyvinylidene fluoride (hereinafter abbreviated to "PVDF" when appropriate).

Of the above-recited polymers for the thermoplastic binder, diene polymers, and crosslinked acrylate polymers and crosslinked methacrylate polymers are preferable. Crosslinked acrylate polymers and crosslinked methacrylate polymers are especially preferable. In the case when these polymers are used as the thermoplastic binder, an electrode layer having enhanced adhesion to a collector and improved surface smoothness can be obtained, and an electrode for an electric double layer capacitor exhibiting high capacitance and low internal resistance can be obtained.

No limitation is imposed to the shape of the thermoplastic binder used for the production of spherical particles (A), but, the binder is preferably in the form of particles because the binding force is enhanced, and the reduction of capacitance of the electrode and the deterioration during the use of the electrode can be minimized. The thermoplastic binder of a particle form includes, for example, liquid dispersions containing thermoplastic binder particles dispersed in water or an organic solvent, such as latex prepared by a conventional procedure such as emulsion polymerization procedure; and thermoplastic binder powders prepared by drying the thermoplastic binder of a particle form. The average particle diameter of the thermoplastic binder of a particle form is not particularly limited, but is usually in the range of 0.0001 to 100 µm, preferably 0.001 to 10 µm and more preferably 0.01 to 1 µm.

When the average particle diameter of thermoplastic binder particles is within these ranges, a high binding force can be manifested in an electrode layer. By the term "average particle diameter" as used herein is meant a number average particle diameter as determined by the measurement on 100 polymer particles chosen in random by using a transmission electron microscope and the calculation as an arithmetic mean value. The shape of binder particles may be any of true sphere or odd-shape.

The thermoplastic binder may have a core-shell structure which is made by polymerizing at least two kinds of monomer mixtures at two or more stages. Preferably the thermoplastic binder of a core-shell structure is made by a process wherein a monomer composition giving a first polymer is polymerized in a vessel, and a monomer composition giving a second polymer is polymerized in the same vessel containing the first polymer as a seed particle, or in another vessel into which a predetermined amount of the first polymer has been incorporated.

The proportion of the core portion to the shell portion in the core-shell structure of the thermoplastic binder is not particularly limited, but, the core portion/shell portion ratio by mass is usually in the range of 20/80 to 99/1, preferably 30/70 to 97/3 and more preferably 40/60 to 95/5. Each of the core portion and the shell portion may be composed of any of the above-mentioned thermoplastic polymers. If two glass transition temperatures (Tg) are observed, the Tg lower than the other is preferably within the above-ranges. It is preferable that the lower Tg is lower than 0° C. and the other Tg is 0° C. or higher. The difference between Tg of the core portion and Tg of the shell portion is usually at least 20° C., preferably at least 50° C.

The thermoplastic binder may be used either alone or as a combination of at least two thereof. The amount of thermoplastic binder is, based on 100 parts by weight of the electrode active material, usually in the range of 0.001 to 50 parts by weight, preferably 0.01 to 10 parts by weight and more preferably 0.1 to 5 parts by weight. When the amount of binder is too small, the electrode material for an electric double layer capacitor is difficult to shape into a sheet form. In contrast, when the amount of binder is too large, the internal resistance of the electrode for an electric double layer capacitor tends to be undesirably large.

(3). Other Ingredients

The spherical particles (A) may comprise, if desired, an optional electrically conductive material, and a dispersant and other additives, which are explained below.

The electrically conductive material optionally used in the present invention has a function of imparting electrical conductivity to the electrode material for an electric double layer capacitor. It is preferable to incorporate the electrically conductive material in spherical particles (A), because the electrically conductive material can be uniformly dispersed in the electrode at the step of making the electrode. The electrically conductive material includes carbon materials and metal materials. Carbon materials are preferable. The carbon materials are non-porous carbon allotropes having electrical conductivity and capable of forming a electric double layer. As specific examples of the carbon materials, there can be mentioned carbon black such as furnace black, acetylene black and Ketjen black (trade mark, Akzo Nobel Chemicals B.V.); carbon fiber such as vapor grown carbon fiber; natural graphite; and artificial graphite. The metal materials are metal compounds having an electrical conductivity, and, as specific examples thereof, there can be mentioned particles of titanium oxide, ruthenium oxide, aluminum or nickel; and metal fibers. Of these, carbon black is preferable. Acetylene black and furnace black are especially preferable. The electrically conductive material used in the present invention usually has a weight average particle diameter in the range of 0.1 to 100 µm.

These electrically conductive materials may be used either alone or as a combination of at least two thereof. The amount of the conductive material is usually in the range of 0 to 50 parts by weight, preferably 0.5 to 15 parts by weight and more preferably 1 to 5 parts by weight, based on 100 parts by weight of the electrode active material. When the amount of the conductive material is within this range, the resulting electrode has well balanced capacitance and internal resistance.

The spherical particles (A) may comprise other additives such as a surface active agent. The surface active agent includes, anion, cation, nonion, and nonionic anion surface active agents. These additives may be used either alone or as a combination of at least two thereof. The amounts of the additives are not particularly limited, but, are in the range of 0 to 50 parts by weight, preferably 0.1 to 10 parts by weight and more preferably 0.5 to 5 parts by weight, based on 100 parts by weight of the electrode active material.

(4). Characteristics of Spherical Particles (A)

The spherical particles (A) contained in the electrode material according to the present invention have substantially spherical shape. That is, the spherical particles (A) have a sphereness degree of not larger than 20%, preferably not larger than 10%, as defined by the following equation:

$$\text{Sphereness degree (\%)} = (L_l - L_s) \times 100 / L_a$$

where $L_s$ is short axis diameter of the spherical particles,
$L_l$ is long axis diameter of the spherical particles, and
$L_a$ is defined by the equation:

$$L_a = (L_l + L_s)/2.$$

The short axis diameter $L_s$ and the long axis diameter $L_l$ are measured on the photographs of transmission electron microscope. The spherical particles (A) have a particle diameter such that the average particle diameter as measured by the gravitometric classification method is usually in the range of 0.1 to 1,000 µm, preferably 5 to 500 µm and more preferably 10 to 100 µm. The spherical particles (A) have a repose angle of not larger than 50°, preferably not larger than 40° and more preferably not larger than 300°.

When the shape of spherical particles (A) satisfy the above-mentioned requirements, fluidity of particles (A) increases, and therefore, the electrode material easily spreads and an electrode having uniform thickness can easily be formed at the step of making the electrode. This leads to a high improvement of uniformity in electrode density of the electrode for an electric double layer capacitor.

The electrode material according to the present invention may comprise non-spherical particles in addition to the spherical particles (A) provided that the effect of the present invention can be obtained, but, the average sphereness degree of the electrode material is preferably not larger than 20% and more preferably not larger than 10%. The amount of spherical particles (A) in the electrode material is usually at least 50% by weight, preferably at least 70% by weight and more preferably at least 90% by weight.

(5). Process for Making Spherical Particles (A)

The spherical particles (A) are made by a method wherein the electrode material, the thermoplastic binder and other optional ingredients are mixed together, and the mixture is shaped into spherical particles. The method for making the spherical particles (A) is not particularly limited provided that spherical particles are obtained, and includes, for example, methods of spray dry granulation, rolling fluidized bed granulation, compression granulation, agitation granulation, extrusion granulation and melt granulation. Of these, spray dry granulation method, rolling fluidized bed granulation method and agitation granulation method are preferable because spherical particles having high uniformity can be made. Spray dry granulation method is especially preferable.

The spray dry granulation method includes the steps of mixing together an electrode active material, a thermoplastic binder and other optional ingredients in a solvent to prepare a liquid dispersion, and then spray drying the liquid dispersion to form spherical particles (A). More specifically, in the step of forming spherical particles (A), the above-mentioned liquid dispersion is sprayed through an atomizer of a spray drying apparatus and the sprayed liquid dispersion is dried within a drying column to form spherical particles (A) comprising the electrode active material, a thermoplastic binder and other optional ingredients.

The solvent used for the preparation of the liquid dispersion is appropriately chosen depending upon the particular thermoplastic binder. Water is most preferably used, but, organic solvents may be used. As specific examples of the organic solvent, there can be mentioned alkyl alcohols such as methyl alcohol, ethyl alcohol and propyl alcohol; alkyl ketones such as acetone and methyl ethyl ketone; ethers such as tetrahydrofuran, dioxane and diglyme; amides such as dimethylformamide, dimethylacetamide, N-methyl-2-pyrrolidone (hereinafter abbreviated to "NMP" when appropriate); and sulfur-containing solvents such as dimethylsulfoxide and sulfolane. Of these, alkyl alcohols are preferable. When an organic solvent having a boiling point lower than that of water is used in combination with water, the drying can be conducted at an enhanced rate while the droplets are fluidized at the step of granulation. Further, the dispersibility of thermoplastic binder and the solubility of dispersant vary, and thus, the viscosity and fluidity of slurry can be controlled by the amount and kind of solvent. Therefore, the handling characteristics and the production efficiency can be improved.

The above-mentioned solvents may be used either alone or as a combination of at least two thereof. The amount of the solvent used is such that the solid concentration of the liquid dispersion is usually in the range of 1 to 50% by weight, preferably 5 to 40% by weight and more preferably 10 to 30% by weight. When the solid concentration of liquid dispersion is in this range, the dispersibility of thermoplastic binder is highly enhanced.

A dispersant may be used in combination with the solvent. The dispersant used in the present invention has a function of improving the uniform dispersibility of the electrode material, the thermoplastic binder and other ingredients. The dispersant mayor may not have a binding force. The dispersant may be chosen from the above-mentioned binders provided that the dispersant is soluble in the particular solvent used.

As specific examples of water-soluble dispersants which are used in the case when water is used as the solvent, there can be mentioned cellulosic polymers carboxymethylcellulose, methylcellulose and hydroxypropylcellulose, and their ammonium salts and alkali metal salts; homopolymers of unsaturated carboxylic acids such as acrylic acid, methacrylic acid, fumaric acid, maleic acid and maleic anhydride, copolymers comprising units of these unsaturated carboxylic acids and vinyl alcohol units, and salts thereof; polyvinyl alcohol and modified polyvinyl alcohol; and polyethylene oxide, poyvinyl pyrrolidone, polyethylene glycol, oxidized starch, starch phosphate, casein, modified starches, chitin and chitosan derivatives.

As specific examples of organic solvent-soluble dispersants which are used in the case when an organic solvent is used as the solvent, there can be mentioned fluorine-containing polymers such as PVDF, and diene polymers such as an acrylonitrile-butadiene copolymer and a hydrogenated product thereof.

The dispersants are appropriately chosen depending upon the particular solvent used. Of the above-recited dispersants, cellulosic polymers, and their ammonium salts and alkali metal salts are preferable.

These dispersants may be used either alone or as a combination of at least two thereof. The amount of dispersant is not particularly limited, but is in the range of 0 to 50 parts by weight, preferably 0.1 to 10 parts by weight and more preferably 0.5 to 5 parts by weight, based on 100 parts by weight of the electrode active material.

No limitation is imposed on the procedure for preparing the above-mentioned liquid dispersion. For example, mixing means such as a ball mill, a sand mill, a pigment dispersion mixer, a grounding pulverizer, a ultrasonic dispersion mixer, a homogenizer and a planetary mixer can be used for the preparation of the liquid dispersion. The mixing conditions are appropriately chosen depending upon the particular ingredients to be mixed. Usually the mixing temperature is in the range of room temperature to 80° C., and the mixing time is in the range of 10 minutes to several hours.

The procedure for spraying the liquid dispersion is not particularly limited, and, for example, the conventional spray dryers can be used. The spray dryers is composed of a pulverizing part, a drying part and a powder-recovering part. The pulverizing part is provided with an atomizer for reducing the liquid dispersion into droplets and dispersing the droplets in a jet thereof within the drying part. The atomizer is classified into two types, i.e., a rotating disk type and a spray type. Both types can be used, but a rotating disk type is preferable. In the rotating disk type atomizer, a liquid dispersion is introduced in the center of a disk rotating at a high speed, and, when the liquid dispersion leave the disk, the liquid dispersion is reduced into a fine jet of droplets. The rotation speed of the disk varies depending upon the size of the disk, but is usually in the range of 5,000 to 30,000 rpm, preferably 15,000 to 30,000. In the spray type atomizer, the liquid dispersion is pressurized to be sprayed through a nozzle into a fine jet of droplets. The temperature of the liquid dispersion to be sprayed is usually in the range of 20 to 250° C.

In the drying part through which hot air flows, droplets formed from the liquid dispersion by the atomizer are heated whereby the solvent is evaporated to be removed from the droplets. Thus the droplets are dried into spherical particles. The temperature of the hot air is usually 80 to 300° C., preferably 100 to 200° C.

The thus-formed spherical particles are collected in the powder-recovering part. The obtained spherical particles contain well balanced amounts of the electrode active material and the thermoplastic binder, and substantially uniform spherical shape and particle diameter. When the liquid dispersion is evaporated into dryness, aggregation occurs to give an electrode material having a high bulk density.

In the rolling fluidized bed granulation method and the agitation granulation method, a thermoplastic binder is sprayed onto an electrode active material which is forced to flow, thus forming sphere particles. These granulation methods are different in the method of fluidizing the electrode active material. In the rolling fluidized bed granulation method, powdery electrode active material and other ingredients are rolled to be fluidized within a rotating vessel such as a rotating drum or a rotating bowl. In the agitation granulation method, powdery electrode active material and other ingredients are forced to be fluidized by an agitating element within a vessel.

In the case when optional ingredients such as an electrically conductive material and a dispersant are used in the above-mentioned granulation methods, these ingredients may be either fluidized together with the electrode active material, or spread on the electrode active material together with a thermoplastic binder.

When the optional ingredients are fluidized together with the electrode active material, it is preferable that the optional ingredients such as an electrically conductive material are preliminarily deposited on the surfaces of the electrode active material. This is because materials having different specific gravities can be uniformly dispersed. The deposition of the optional ingredients such as an electrically conductive material on the surfaces of the electrode active material can be conducted, for example, by a method wherein the electrode active material and the optional ingredients such as an electrically conductive material are subjected to a mechanochemical treatment whereby these ingredients are mixed together while an external mechanical force such as compression force or shear force are applied. The apparatus for conducting the mechanochemical treatment includes, for example, a kneader such as a pressure kneader and a twin-roll kneader; high-speed impact-type dry powder-composition apparatus such as a rotational ball mill and Hybridization system (available from Nara Machinery Co., Ltd.); and compression shear-type dry powder-composition apparatus such as Mechanofusion system (available from Hosokawa Micron Group).

When the optional ingredients are spread together with a thermoplastic binder, a procedure can be adopted, for example, wherein a thermoplastic binder, an electrically conductive material and a dispersant are uniformly mixed in a solvent, and the thus-obtained uniform dispersion is sprayed on a fluidized bed of the electrode active material to form spherical particles.

Thus-made spherical particles (A) enhances the dispersibility of the electrode active material and the thermoplastic binder. Therefore, the amount of the thermoplastic binder to be incorporated in the electrode for an electric double layer capacitor can be reduced, and therefore, the electrode for an electric double layer capacitor has a low internal resistance and high capacitance.

(6). Process for Making Electrode

The process for making the electrode for an electric double layer capacitor according to the present invention comprises the step of forming on a collector an electrode layer comprised of the electrode material for an electric double layer capacitor of the present invention.

The collector used in the present invention includes, for example, metal, carbon and electrically conductive polymers. Of these, metal is preferable. As specific examples of the metal for a collector, there can be mentioned aluminum, platinum, nickel, tantalum, titanium, stainless steel and other alloys. Of these, aluminum and aluminum alloys are preferable in view of electrical conductivity and dielectric strength. When a high dielectric strength is required, high-purity aluminum as described in, for example, Japanese Unexamined Patent Publication 2001-176757 is especially preferably used. The collector is a film or sheet form. The thickness thereof is appropriately chosen depending upon the particular use of capacitor, but it is usually in the range of 1 to 200 µm, preferably 5 to 100 µm and more preferably 10 to 50 µm.

The electrode layer can be formed by a process wherein a sheet of the electrode material for an electric double layer capacitor is prepared, and then, the sheet of the electrode material is laminated onto a collector; or a process wherein the electrode material is directly formed into an electrode layer on a collector. In the case when an electrode layer is directly formed on a collector, a procedure of applying the electrode material on a collector and then smoothing the applied electrode material, for example, by a blade, can be adopted. This procedure is preferable because the electrode density can easily be uniform at the step of the formation of electrode layer.

The method of forming the electrode layer from the electrode material of the present invention is not particularly limited, and includes, for example, a dry forming method such as compression forming method, and a wet forming method such as coating method. Of these, a dry forming method is preferable because a drying step is not necessary and the production cost is low. The dry forming method is not particularly limited, and, as specific examples thereof, there can be mentioned a compression molding method wherein the electrode material for an electric double layer capacitor is filled in a mold, and the filled electrode material is pressurized whereby the material is deformed and densified to form an electrode layer; and an extrusion shaping method wherein the electrode material for an electric double layer capacitor is extruded into an electrode layer having a continuous film or sheet form (this method is also called as "paste-extrusion method").

Of the above-mentioned methods, a pressure molding method is preferable because the method can be carried out by a simple apparatus. In the pressure molding method using spherical particles (A), the particles (A) are spread on a collector by using, for example, a screw-feeder, and the pressure is applied to the spread particles by a pressure apparatus. Alternatively, the spherical particles (A) are quantitatively fed onto a protective film or a collector by a feeder, and the particles are pressed, for example, by a roller, thus continuously forming an electrode layer. Or, the spherical particles (A) are fed to a roll-type pressure molding apparatus provided with two parallel rolls by a feeder, for example, a screw-feeder, and the particles are pressure-molded into an electrode layer.

A small amount of a shaping aid such as water or an alcohol may be used in the dry forming method. The dry forming is carried out usually within a temperature range of 0° C. to 200° C. and preferably at a temperature of at least 20° C. higher than the transition temperature of the thermoplastic binder.

If desired, a post-pressing can be carried out for rendering uniform the thickness of electrode layer and enhancing the density of electrode layer to give a capacitor of higher capacitance. The post-pressing is usually conducted by using pressing rolls. More specifically an electrode is fed into a narrow gap between a pair of upper and lower cylindrical rolls which are arranged in parallel with the narrow gap and rotate in different directions, whereby the electrode is pressed. The pressing rolls may be heated or cooled to control the temperature.

(7). Electric Double Layer Capacitor

The electric double layer capacitor according to the present invention has the above-mentioned electrode for an electric double layer capacitor which is made by the above-mentioned process. The electric double layer capacitor is manufactured by the conventional process using the above-mentioned electrode, an electrolyte, separators and other elements. More specifically, the electrode for an electric double layer capacitor is cut into pieces of an appropriate size, then, the pieces of electrode are superposed with separators intervening between the adjacent pieces of electrode, and the superposed pieces of electrode are wound into a capacitor element. The capacitor element is placed in a container, and an electrolyte is filled in the container, and the container is sealed.

The electrolyte is not particularly limited, but a non-aqueous electrolyte solution is preferable which is a solution of a electrolyte in an organic solvent. As specific examples of the electrolyte, there can be mentioned tetraethylammonium tetrafluoroborate, triethylmonomethylammonium tetrafluoroborate and tetraethylammonium hexafluorophosphate.

The solvent in which the electrolyte is dissolved is not particularly limited, provided that it is capable of being conventionally used as solvent for an electrolyte. The solvent includes, for example, carbonates such as propylene carbonate, ethylene carbonate and butylene carbonate; lactones such as γ-butyrolactone; sulfolanes; and nitriles such as acetonitrile. These solvents may be used either alone or as a mixed solvent composed of at least two thereof. Of these, carbonates are preferable. The concentration of electrolyte is usually at least 0.5 mole/L, preferably at least 0.8 mole/L.

The separator used includes, for example, a microporous film or nonwoven fabric made of polyolefin such as polyethylene or polypropylene; and a porous membrane which is generally called as an electrolytic capacitor paper and made from pulp as a main raw material. In place of the separator, a solid electrolyte or a gel electrolyte may be used.

EXAMPLES

The invention will now be described specifically by the following examples and comparative examples, which by no means limit the scope of the invention. Parts and % are by weight unless otherwise specified.

Example 1

Production of Electrode Material for Electric Double Layer Capacitor 50 parts of acetylene black ("Denka Black" available from Denki Kagaku Kogyo K.K., powdery) having an average particle diameter of 7 μm as an electrically conductive material, 200 parts of an aqueous solution ("Cellogen 7A" available from Dai-ichi Kogyo Seiyaku Co., Ltd.) containing 5% of carboxymethylcellulose as a dispersant, and 50 parts of water were mixed together by a planetary mixer to prepare an aqueous dispersion of an electrically conductive material having a solid concentration of 20%. 30 parts of the aqueous dispersion of electrically conductive material, 8 parts of an aqueous solution ("Cellogen 7A") containing 5% of carboxymethylcellulose, 100 parts of a high-purity activated carbon powder having a specific surface area of 2,000 $m^2/g$ and an average particle diameter of 5 μm as an electrode active material, 7.5 parts of an aqueous dispersion ("BM400B" available from Zeon Corporation; concentration: 40%) of a carboxy-modified styrene-butadiene copolymer (average particle diameter: 0.12 μm, glass transition temperature: −5° C.), and water were mixed together by a planetary mixer to give a composition (I) of a slurry form.

The composition (I) was diluted with water to prepare an aqueous slurry having a solid concentration of 21%. The aqueous slurry was spray-dried by a spray dryer ("OC-16" available from Okawara Kakoki K.K.) with a rotational disk-type atomizer (diameter: 65 mm) at a rotation number of 20,000 rpm, a hot air temperature of 150° C. and a temperature of the outlet for recovered particles of 90° C. to prepare particles (A-1).

Properties of Particles (A-1)

The particle diameter of the particles (A-1) was measured according to weight classification using a particle diameter-measuring apparatus ("Powder Tester PT-R" available from Hosokawa Micron Group). The weight average particle diameter was 70 μm. Short axis diameter $L_s$ and Long axis diameter $L_l$ were measured on 20 particles chosen in random from an electron microscope photograph, and the average axis diameter $L_a$ as defined by the equation:

$$L_a=(L_l+L_s)/2,$$

and the sphereness degree as defined by the following equation were calculated.

$$\text{Sphereness degree (\%)}=(L_l-L_s)\times 100/L_a$$

All of the 20 particles (A-1) had a sphereness degree of not larger than 5%, and had a spherical shape.

Fluidity of the particles (A-1) was evaluated according to JIS K6720 as follows. A bulk density-measuring funnel was filled with the particles (A-1) and then a damper was rapidly removed. The particles were smoothly fallen down.

Angle of repose of the particles (A-1) was measured by a repose angle-measuring apparatus (Powder-Tester PT-R), and the fluidity was evaluated according to the following four ratings.

A: repose angle is smaller than 300
B: repose angle is at least 30°, but smaller than 50°
C: repose angle is at least 50°, but smaller than 60°
D: repose angle is at least 60°

The results are shown in Table 1.

TABLE 1

|  | Example | | | | Comparative Example | | |
|---|---|---|---|---|---|---|---|
|  | 1 | 2 | 3 | 4 | 1 | 2 | 3 |
| Properties of particles |  |  |  |  |  |  |  |
| Average particle diameter (μm) | 70 | 70 | 70 | 70 | — | 70 | 48 |
| Shape of particles *1 | Sph | Sph | Sph | Sph | Ind | Sph | Ind |
| Fluidity | A | A | A | A | D | B | C |
| Electrode for electric double layer capacitor |  |  |  |  |  |  |  |
| Pliability | B | A | B | A | B | D | D |
| Strength | B | A | B | A | C | D | D |
| Density | B | A | B | A | D | D | C |
| Uniformity of density | A | A | A | A | D | B | C |
| Electric double layer capacitor |  |  |  |  |  |  |  |
| Internal resistance | B | A | B | A | D | B | C |
| Capacitance | B | A | B | A | C | D | C |

*1 Shape of particles, Sph: spherical shape, Ind: indeterminate shape

Electrode for Electric Double Layer Capacitor

The particles (A-1) were spread on an aluminum collector having a thickness of 40 μm by a screw feeder, and the surface of spread particles were smoothed by a blade to render the thickness uniform. Then the particles were press-molded by a pressure apparatus at room temperature (25° C.) to give an electrode for a double layer capacitor with an electrode layer having a thickness of 200 μm. The electrode was evaluated for its pliability, strength, density and uniformity of density, by the following methods. The results are shown in Table 1.

(1) Electrode Pliability

Two specimens each having a rectangular shape with a length of 100 mm and a width of 50 mm were cut from the electrode for an electric double layer capacitor. Pliability was measured according to JIS K5600-5-1 using Type-1 testing apparatus. Two cylindrical mandrels having a folded portion with a diameter of 25 mm or 32 mm were used. The specimen was fitted to the testing apparatus, and a hinge of a horizontal state was folded at an angle of 180°. Occurrence of cracks was observed by a magnifier, and the pliability was expressed by the following four ratings.

A: crack did not occur in both of 25 mm and 32 mm diameter specimen

B: cracks occurred in 25 diameter specimen but did not occur in 32 mm diameter specimen C: cracks occurred in both of 25 mm and 32 mm diameter specimen D: specimen was broken at mandrel portion (2) Electrode Strength A specimen having a rectangular shape with a length of 10 cm and a width of 2.5 cm were cut from the electrode for an electric double layer capacitor. The specimen was fitted so that its electrode layer lies upward. A self-adhesive cellophane tape was adhered on the surface of electrode layer. Stress (N/cm) was measured ten times at the time when the cellophane tape was peeled at a rate of 50 mm/min and a peel angle of 180°. An average stress value of the 10 stresses was calculated, and the strength of electrode was evaluated according to the following four ratings.

A: stress is at least 0.8 N/cm

B: stress is at least 0.6 N/cm, but smaller than 0.8 N/cm

C: stress is at least 0.4 N/cm, but smaller than 0.6 N/cm

D: stress is smaller than 0.4 N/cm (3) Electrode Density and Uniformity of Electrode Density A specimen having a rectangular shape with a size of 40 mm×60 mm was cut from the electrode for an electric double layer capacitor. Weight and volume of the specimen were measured, and the electrode density was measured on the electrode portion other than the collector potion. The electrode density was evaluated according to the following four ratings.

A: electrode density is at least 0.60 g/cm$^3$

B: electrode density is at least 0.55 g/cm$^3$, but smaller than 0.60 g/cm$^3$

C: electrode density is at least 0.50 g/cm$^3$, but smaller than 0.55 g/cm$^3$

D: electrode density is smaller than 0.50 g/cm$^3$

The above-mentioned specimen was cut into small specimens each having a square shape with a size of 10 mm×10 mm. Weight of each small specimen was measured, and the electrode density was measured on the electrode portion other than the collector potion. The difference between the electrode density of each small specimen and the electrode density of the specimen before cutting into the small specimens was calculated. The uniformity of electrode density is defined by the maximum difference value of the differences in electrode density, and was evaluated by the following four ratings.

A: maximum difference is not larger than 0.1 g/cm$^3$

B: maximum difference is at least 0.1 g/cm$^3$, but not larger than 0.15 g/cm$^3$ C: maximum difference is at least 0.15 g/cm$^3$, but not larger than 0.2 g/cm$^3$ D: maximum difference is at least 0.2 g/cm$^3$ Electric Double Layer Capacitor Two electrodes each having a size of 4 cm×6 cm except for a lead terminal were cut from the electrode, prepared above, and a polyethylene separator having a thickness of 25 μm was sandwiched between the two electrodes. The sandwich of electrode/separator/electrode was sandwiched between two polypropylene plates each having a thickness of 2 mm, a width of 5 cm and a height of 7 cm. The thickness between the inner surfaces of the plates was 0.68 mm. The sandwich of polypropylene/electrode/separator/electrode/polypropylene was impregnated with an electrolyte which was a triethylenemonomethylammonium tetrafluoroborate solution in propylene carbonate with a concentration of 1.5 mol/L under a reduced pressure. Then the electrolyte-impregnated sandwich was put in a polypropylene container to give an electric double layer capacitor.

The electric double layer capacitor was subjected to a cycle of charge-discharge wherein charge was carried out at a constant current of 10 mA at 25° C. from 0 V to 2.7 V for 10 minutes, then, discharge was carried out at a constant current of 1 mA from 2.7 V to 0 V. The electrostatic capacity was determined from the thus-obtained charge-discharge curve, and the capacitance per unit mass of the electrode layer was calculated from the electrostatic capacity according to the following equation.

Capacitance=electrostatic capacity/mass of electrode layer where mass of electrode layer=(mass of electrode−mass of collector)

The internal resistance was calculated from the charge-discharge curve according to the standard RC-2377 stipulated by Japan Electronics and Information Technology Industries Association. The internal resistance and the capacitance were evaluated according to the following four ratings.

Internal Resistance
A: not larger than 4
B: at least 40, but not larger than 5Ω
C: at least 50, but not larger than 6Ω
D: at least 6Ω
Capacitance
A: at least 58 F/g
B: at least 55 F/g, but smaller than 58 F/g
C: at least 45 F/g, but smaller than 55 F/g
D: smaller than 45 F/g Example 2

Electrode Material for Electric Double Layer Capacitor

Particles (A-2) were made by the same procedures as described in Example 1 wherein, instead of 7.5 parts of the aqueous dispersion ("BM400B") of a carboxy-modified styrene-butadiene copolymer, 7.5 parts of an aqueous dispersion (40% concentration) of a 2-ethylhexyl acrylate/styrene/methacrylic acid/ethyleneglycol dimethacrylate copolymer (ratio of 80/14/4/2 by weight) (particle diameter; 0.15 μm, glass transition temperature: −40° C.) was used as a thermoplastic binder. All other conditions remained the same.

The configuration of the particles (A-2) was evaluated. The weight average particle diameter was 70 μm. All of the particles (A-1) had a sphereness degree of not larger than 5%, and had a spherical shape.

Fluidity of the particles (A-2) was evaluated using the same bulk density-measuring funnel as used in Example 1. The particles were smoothly fallen down from the funnel. Angle of repose of the particles (A-2) was measured by the same way as described in Example 1. The results are shown in Table 1.

Electrode for Electric Double Layer Capacitor

An electrode for an electric double layer capacitor was made at room temperature by the same procedures as described in Example 1 except that the particles (A-2) were used instead of the particles (A-1) with all other conditions remaining the same.

The electrode was evaluated for its pliability, strength, density and uniformity of density, by the same methods as described in Example 1. The results are shown in Table 1.

Electric Double Layer Capacitor

An electrode for an electric double layer capacitor was made from the above-mentioned electrode by the same procedures as described in Example 1, and its characteristics were evaluated by the same methods as described in Example 1. The results are shown in Table 1.

Comparative Example 1

Electrode Material for Electric Double Layer Capacitor

The slurry composition (I) was poured in a vat, and dried to give a coagulated mixture. The coagulated mixture was pulverized to prepare particles (B-1). The size of particles (B-1) was broadly distributed. Therefore, the particles (B-1) were passed through a sieve with a 40 mesh size, and the passed particles were passed through a sieve with a 80 mesh size. The residual particles (B-1)' on the sieve with a 80 mesh size were evaluated for their sphereness degree in the same manner as described in Example 1. All of the particles (B-1)' had a sphereness degree of larger than 40%, and the particles had indeterminate form. Fluidity of the particles (B-1) was evaluated using the same bulk density-measuring funnel as used in Example 1. The particles were not smoothly fallen down from the funnel. Angle of repose of the particles (B-1)' was measured by the same way as described in Example 1. The results are shown in Table 1.

Electrode for Electric Double Layer Capacitor

The particles (B-1)' were spread on a collector by a screw feeder, and the surface of spread particles were smoothed by a blade to render the thickness uniform. But, the surface of particles was marked with streaks. Then the particles were press-molded by the same procedures as described in Example 1 to give an electrode for a double layer capacitor with an electrode layer having a thickness of 200 μm. The pliability, strength, density and uniformity of density of the electrode were evaluated on a portion of the electrode which had not been marked with streaks, by the same methods as described in Example 1. The results are shown in Table 1.

Electric Double Layer Capacitor

An electrode for an electric double layer capacitor was made from the portion of the above-mentioned electrode which had not been marked with streaks, by the same procedures as described in Example 1, and its characteristics were evaluated by the same methods as described in Example 1. The results are shown in Table 1.

Comparative Example 2

Electrode Material for Electric Double Layer Capacitor 70 parts of high-purity activated carbon powder having a specific surface area of 2,000 m$^2$/g and an average particle diameter of 5 μm as an electrode active material, 30 parts of a phenol resin as a thermosetting binder, and 200 parts of acetone were mixed together by a planetary mixer to prepare a composition (II) of a slurry form. The slurry composition (I) was spray-dried by the same procedures as described in Example 1 to prepare particles (B-2).

The configuration of the particles (B-2) was evaluated by the same methods as described in Example 1. The average particle diameter was 70 μm. All of the particles (B-2) had a sphereness degree of not larger than 5%, and the particles were spherical. Fluidity of the particles (B-2) was evaluated using the same funnel as used in Example 1. The particles were smoothly fallen down from the funnel. Angle of repose of the particles (B-2) was measured by the same way as described in Example 1. The results are shown in Table 1.

Electrode for Electric Double Layer Capacitor

The particles (B-2) were press-molded to form a film, and the film was heated at 900° C. in a nitrogen gas atmosphere for 2 hours in an electric oven to prepare an electrode layer. A collector was coated with an electrically conductive adhesive to form a coating having a thickness of 5 μm as expressed as dry thickness, and the coating was dried. The electrode layer made from the particles (B-2) was laminated on the adhesive coating on the collector, and pressed by rolls in the same manner as described in Example 1 to give an electrode for an electric double layer capacitor with an electrode thickness of 200 μm.

The electrically conductive adhesive was prepared as follows. 100 parts of acetylene black, 20 parts of an aqueous 10% carboxymethylcellulose solution ("Cellogen 7H" available from Dai-ichi Kogyo Seiyaku Co., Ltd.), 31.3 parts of an aqueous dispersion ("BM400B" available from Zeon Corporation; concentration: 40%) of a carboxy-modified styrene-butadiene copolymer, and 10.2 parts of soft water were kneaded together by a kneader, and the kneaded mixture was diluted with water. The electrically conductive adhesive had a solid concentration of 30%, and the acetylene black had an average particle diameter of 0.5 μm as measured by a light scattering method.

The pliability, strength, density and uniformity of density of the electrode were evaluated by the same methods as described in Example 1. The results are shown in Table 1.

Electric Double Layer Capacitor

An electrode for an electric double layer capacitor was made from the above-mentioned electrode for an electric double layer capacitor by the same procedures as described in Example 1, and its characteristics were evaluated by the same methods as described in Example 1. The results are shown in Table 1.

Comparative Example 3

Electrode Material for Electric Double Layer Capacitor 5 parts of acetylene black as an electrode active material, 30 parts of an aqueous 5% carboxymethylcellulose solution as a dispersant, 15 parts of an aqueous 40% dispersion of the same acrylate polymer as used in Example 2 as a binder, and water were mixed together by a planetary mixer to prepare 135 parts of a composition (III) of a slurry form.

100 parts of an activated carbon powder as an electrode active material was fed to a fluidized bed granulation apparatus ("Aglomaster" available from Hosokawa Micron Group) where the above-mentioned slurry composition (III) was sprayed onto the activated carbon powder in a stream of air at 120° C. over a period of 10 minutes to prepare particles (B-3) having a weight average particle diameter of 48 μm.

The above-mentioned acetylene black, the aqueous 5% carboxymethylcellulose solution and an aqueous 40% dispersion of the acrylate polymer and the activated carbon powder were the same as those which are used in Example 2.

The configuration of the particles (B-3) was evaluated by the same methods as described in Example 1. All of the particles (B-3) had a sphereness degree of larger than 40%, and the particles had indeterminate form. Angle of repose of the particles (B-3) was measured to evaluate the fluidity by the same way as described in Example 1. The results are shown in Table 1.

Electrode for Electric Double Layer Capacitor

An electrode for an electric double layer capacitor was made at room temperature by the same procedures as described in Example 1 except that the particles (B-3) were used instead of the particles (A-1) with all other conditions remaining the same.

The electrode was evaluated for its pliability, strength, density and uniformity of density, by the same methods as described in Example 1. The results are shown in Table 1.

Electric Double Layer Capacitor

An electrode for an electric double layer capacitor was made from the above-mentioned electrode by the same procedures as described in Example 1, and its characteristics were evaluated by the same methods as described in Example 1. The results are shown in Table 1.

Examples 3 and 4

In Example 3, an aluminum collector of continuous length with a thickness of 40 μm was placed on a belt. The particles (A-1) were spread on the collector by a screw feeder, and the spread particles were smoothed by a blade to render the thickness uniform. Then the particles were continuously press-molded by a pressure apparatus at room temperature (25° C.) to give an electrode of continuous length for a double layer capacitor with an electrode layer having a thickness of 200 μm.

In Example 4, an electrode of continuous length for a double layer capacitor with an electrode layer having a thickness of 200 μm was made by the same procedures as described in Example 3 except that the particles (A-2) were used instead of the particles (A-1). The electrode of continuous length can be made stably.

The electrodes made in Examples 3 and 4 were evaluated for their characteristics by the same methods as described in Example 1. The results are shown in Table 1.

An electrode for an electric double layer capacitor was made from the above-mentioned electrodes for an electric double layer capacitor by the same procedures as described in Example 1, and their characteristics were evaluated by the same methods as described in Example 1. The results are shown in Table 1.

As seen from the above-mentioned Examples, the electrodes for an electric double layer capacitor made from the electrode material according to the present invention have enhanced strength, pliability and electrode density, and uniform electrode density. Electric double layer capacitors having these electrodes have low internal resistance and high capacitance.

In contrast, the electrode for an electric double layer capacitor in Comparative Example 1, which is made from the electrode material comprising particles having indeterminate form and having poor fluidity, has poor strength, pliability, electrode density and uniformity of electrode density. An electric double layer capacitor having this electrode has low internal resistance and high capacitance.

The electrode for an electric double layer capacitor in Comparative Example 2, which is made from the electrode material comprising particles prepared using a thermosetting binder instead of a thermoplastic binder, has poor strength, pliability and electrode density. An electric double layer capacitor having this electrode has low internal resistance and high capacitance.

INDUSTRIAL APPLICABILITY

The electrode for an electric double layer capacitor made from the electrode material according to the present invention has low internal resistance and high capacitance. Utilizing these beneficial characteristics, an electric double layer capacitor having the electrode is suitable for use in many applications which include electric sources for memory backup in personal computers and personal digital assistants, electric sources for safety for interruption of electrical power in personal computers, applications for electric cars and hybrid cars, solar thermal electric energy storing system comprising the capacitor combined with a solar battery, and load-leveling electric sources comprising the capacitor combined with a battery.

The invention claimed is:

1. An electrode material for an electric double layer capacitor which comprises spherical particles (A) comprising an electrode active material and a thermoplastic binder wherein said spherical particles (A) have a sphereness degree of not larger than 20% as defined by the following equation:

$$\text{Sphereness degree (\%)} = (L_l - L_s) \times 100 / L_a$$

where $L_s$ is short axis diameter of the spherical particles, $L_l$ is long axis diameter of the spherical particles, and $L_a$ is defined by the equation:

$$L_a = (L_l + L_s)/2.$$

2. The electrode material for the electric double layer capacitor according to claim 1, wherein the spherical particles (A) further comprise an electrically conductive material.

3. The electrode material for the electric double layer capacitor according to claim 1, wherein the spherical particles (A) further comprise a dispersant.

4. The electrode material for the electric double layer capacitor according to claim 1, wherein the thermoplastic binder has a transition temperature in the range of $-80°$ C. to $20°$ C.

5. The electrode material for the electric double layer capacitor according to claim 1, wherein the thermoplastic binder has a form of particles.

6. A process for making the electrode material for the electric double layer capacitor as claimed in claim 1, which comprises the steps of:

mixing together the electrode active material with the thermoplastic binder in a solvent to form a liquid dispersion; and then, spray-drying the liquid dispersion to form the spherical particles (A).

7. A process for making an electrode for an electric double layer capacitor, which comprises the step of forming an electrode layer comprising the electrode material for an electric double layer capacitor as claimed in claim 1, on a collector.

8. An electrode for an electric double layer capacitor, which is made by the process as claimed in claim 7.

9. An electric double layer capacitor having the electrode for the electric double layer capacitor as claimed in claim 8.

\* \* \* \* \*